United States Patent [19]
Dodd et al.

[11] Patent Number: 5,894,567

[45] Date of Patent: *Apr. 13, 1999

[54] MECHANISM FOR ENABLING MULTI-BIT COUNTER VALUES TO RELIABLY CROSS BETWEEN CLOCKING DOMAINS

[75] Inventors: James M. Dodd, Citrus Heights; Robert N. Murdoch, Sacramento, both of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/536,109

[22] Filed: Sep. 29, 1995

[51] Int. Cl.$^6$ .................................................. G06F 1/04
[52] U.S. Cl. ........................... 395/551; 395/558; 395/309
[58] Field of Search ................................ 395/306, 308, 395/309, 551, 552, 558, 559

[56] References Cited

U.S. PATENT DOCUMENTS 4,873,703  10/1989  Crandall et al. ..................... 375/118
5,426,756  6/1995   Shyi et al. ........................... 395/425
5,546,546  8/1996   Bell et al. ............................ 395/292

*Primary Examiner*—Dennis M. Butler
*Attorney, Agent, or Firm*—Blakely, Sokoloff, Taylor & Zafman LLP

[57] ABSTRACT

A queue structure for transmitting a multiple-bit signal from a first sub-system operating in a first clocking domain in a computer system to a second sub-system operating in a second clocking domain in the computer system is disclosed. The queue structure comprises a queue data latch having a plurality of storage elements, wherein each of the plurality of storage elements can store the multiple-bit signal from the first sub-system. A load pointer is used for generating a first multiple-bit count indicating one of the plurality of storage element for storing the multiple-bit signal. A synchronization unit is coupled to the load pointer for receiving the first multiple-bit count. The synchronization unit outputs the multiple-bit count at the second sub-system when the multiple-bit signal is ready to be sampled in the second clocking domain.

16 Claims, 5 Drawing Sheets

5,894,567

MECHANISM FOR ENABLING MULTI-BIT COUNTER VALUES TO RELIABLY CROSS BETWEEN CLOCKING DOMAINS

FIELD OF THE INVENTION

The present invention relates to the synchronization of signals. More specifically, the present invention relates to an apparatus and method for reliably transmitting multiple-bit signals across asynchronous time domain boundaries.

BACKGROUND OF THE INVENTION

It is often necessary to transmit multiple-bit signals from one sub-system in a computer system to another. For example, signals are frequently sent between a CPU and a device on a I/O bus. In a computer system with multiple clock domains, the source and destination sub-systems often run on different clocks. When multi-bit signals cross between unrelated clocking domains, there is a finite probability that the signals will not be sampled correctly. Specifically, the arrival time of each bit will be slightly different and the bit may or may not be sampled on the same clock edge in the destination sub-system. This leads to multi-bit values which are sampled incorrectly and faulty operation of the destination sub-system. For example, a two bit signal, 11, transmitted from a source sub-system operating at first clocking domain to a destination sub-system operating at a second clocking domain, at a current state of 00, may initially be sampled as one of four different states. Each of the bits may be sampled as a 0 or 1 independently, depending on the arrival time of the bit in the destination subsystem. Thus, a signal with binary values 00 changing to a value 11 may be sampled initially as 00, 01, or 10 before finally being resolved as 11. In situations when values 01 and 10 represent states with special meaning to circuitry in the destination sub-system, these transitional results would represent invalid data and could lead to faulty operation of the system.

One approach taken to sample multiple-bit signals correctly was the use of a qualifying signal. Data transmitted across asynchronous time domains were asserted for several clock periods by the transmitting sub-system until they were guaranteed to be sampled correctly by the receiving sub-system. After an appropriate number of clock periods, a qualifying signal was asserted by the transmitting sub-system to indicate to the receiving sub-system that the data is valid and ready to be sampled. The receiving sub-system sends an acknowledge signal back to the transmitting sub-system informing it which storage spaces are available for receiving additional data. Upon receiving the acknowledge signal, the transmitting sub-system asserts the next data. Typically, the time taken by the transmitting sub-system to generate a qualifying signal along with the time taken by the receiving sub-system to generate an acknowledge signal limits the amount of data that can be transmitted by the receiving sub-system during a given amount of time. In addition, the individual management required by each storage space involved implementation of additional hardware.

Another approach taken to sampling multi-bit signals was the use of phase-locked loops. Phase-locked loops operate to generate a clocking domain of a second sub-system from a clocking domain of a first sub-system. For example, a phase-locked loop can take a 66 MHz clock signal from a bus and multiply it by 1.5 to generate a 100 MHz internal clock signal for a CPU. The internal clock signal will thus be in a fixed phase relationship with the bus clock signal. Phase-locked loops guarantee phase alignment of the clock domains of two systems such that signals transmitted from the first sub-system may be sampled correctly by the second sub-system. There are, however, several drawbacks to the implementation of phase-locked loops. Phase-locked loops typically consume a large amount power to operate, require additional die area and significant hardware costs.

Thus, what is needed is a method and apparatus for sending multiple-bit signals between asynchronous clock domains. This method and apparatus should allow a high throughput of information between clocking domains and should be efficient and cost effective.

SUMMARY OF THE INVENTION

A method and apparatus for transmitting multiple-bit signals from a first asynchronous clocking domain to a second asynchronous clocking domain is disclosed. One embodiment of a queue structure for transmitting multiple-bit signal from a first sub-system operating in a first clocking domain in a computer system to a second sub-system operating in a second clocking domain in the computer system, according to the present invention, comprises a queue data latch having a plurality of storage elements. Each of the plurality of storage elements is capable of storing a multiple-bit signal from the first sub-system. A load pointer is coupled to the queue data latch. The load pointer outputs a first multiple-bit count which indicates which of the plurality of storage elements has most recently been accessed to store a multiple-bit data. A synchronization unit is coupled to the load pointer. The synchronization unit receives the first multiple-bit count from the load pointer and outputs the first multiple-bit count at the second sub-system at a time when the multiple-bit signal is ready to be sampled in the second clocking domain.

In another embodiment of the queue structure, a use pointer is coupled to the synchronization unit for generating a second multiple-bit count. The use pointer indicates which of the plurality of storage elements has most recently been accessed by the second sub-system in the sampling of a stored multiple-bit signal. An input pointer compare unit is coupled to the synchronization unit and compares the first multiple-bit count with the second multiple bit count and determines whether a next multiple-bit signal can be stored in one of the plurality of storage elements. An output pointer compare unit is coupled to the synchronization unit and compares the first multiple-bit count with the second multiple-bit count and determines whether a multiple-bit data stored in one of the plurality of storage element is ready to be sampled by the second sub-system.

Another embodiment of the present invention discloses a method for transmitting a multiple-bit signal from a first sub-system operating in a first clocking domain in a computer system to a second sub-system operating in a second clocking domain in the computer system. First, generate a first multiple-bit count indicating which of a plurality of storage elements is to store the data. Synchronize the first multiple-bit count such that the first multiple-bit count is output at the second sub-system when the data is ready to be sampled in the second clocking domain. Send the data to the storage element.

In another embodiment of the present invention, the method for transmitting data from a first sub-system operating in a first clocking domain in a computer system to a second sub-system operating in a second clocking domain in a computer system further comprises the steps of generating a second multiple-bit count indicating which of the plurality of storage elements has most recently been sampled in the second clocking domain and comparing the first multiple-bit count and the second multiple-bit count to determine whether the queue data latch is full or empty.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

A mechanism for transferring data across asynchronous clocking domains is disclosed. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Figure 1:
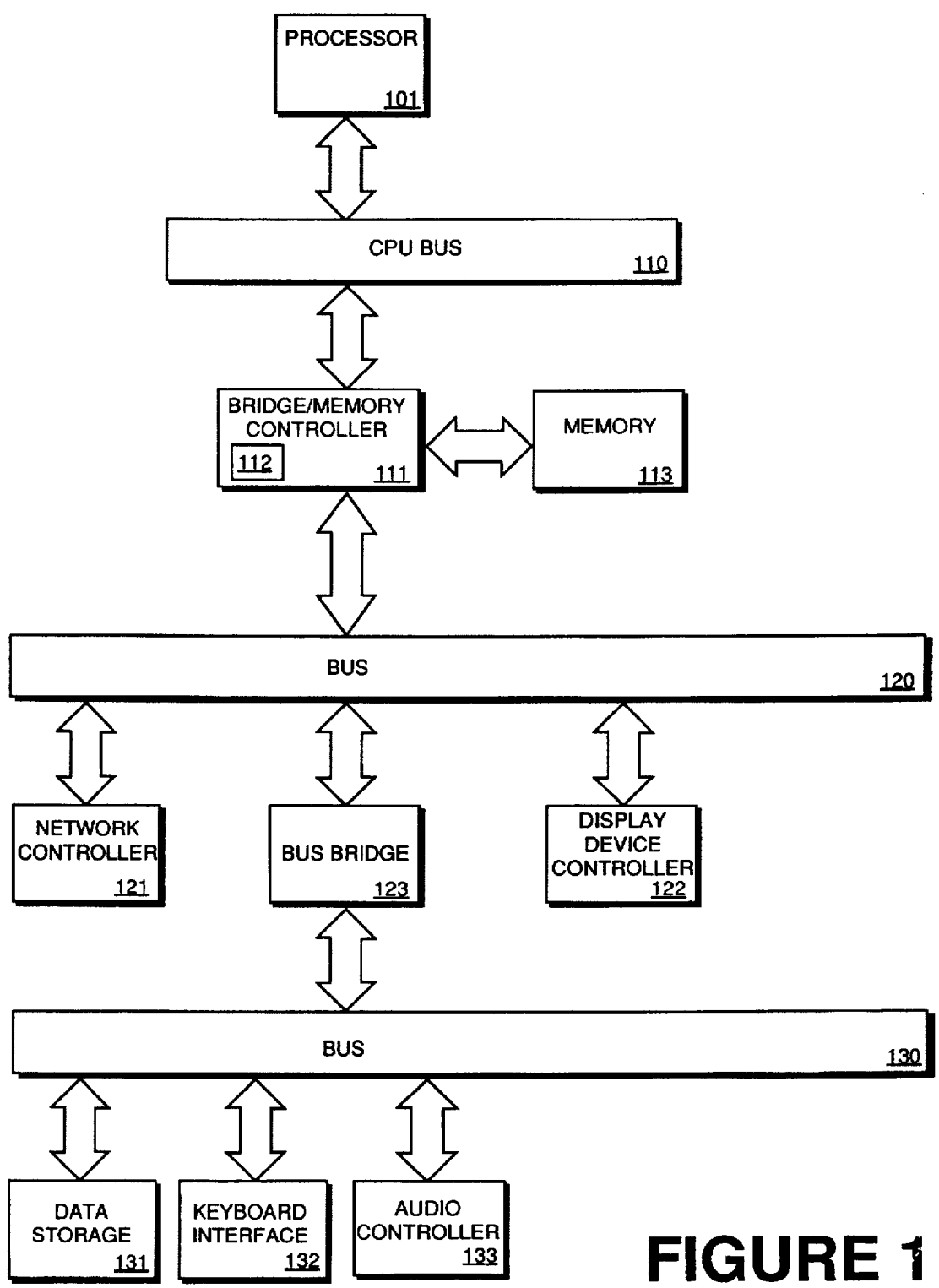
FIG. 1 illustrates an embodiment of the present invention as implemented in a computer system.

FIG. 1 illustrates in block diagram form a computer system of one embodiment of the present invention. The computer system comprises processor 101 for processing digital data. Processor 101 can be a complex instruction set computing (CISC) microprocessor, a reduced instruction set computing (RISC) microprocessor, a very long instruction word (VLIW) microprocessor or other processor device. Processor 101 is coupled to CPU bus 110 which transmits signals between processor 101 and other components in the computer system. Memory 113 is coupled to CPU bus 110 and comprises a dynamic random access memory (DRAM) device, a static random access memory (SRAM) device, or other memory devices. Memory 113 stores information or other intermediate data during execution by processor 101. Bridge memory controller 111 is coupled to CPU bus 110 and memory 113. Bridge memory controller 111 directs data traffic between processor 101, memory 113, and other components in the computer system and bridges signal from these components to high speed I/O bus 120. I/O bus 120 supports peripherals operating at high data throughput rates. Bus 120 can be a single bus or a combination of multiple buses. As an example, bus 120 can comprise a Peripheral Components Interconnect (PCI) bus, a Personal Computer Memory Card International Association (PCMCIA) bus, a VL bus or other buses. Bus 120 provides communication links between components in the computer system. Network controller 121 links a network of computers together and provides communication among the machines. Display device controller 122 is coupled to high speed I/O bus 120. Display device controller 122 allows coupling of a display device to the computer system and acts as an interface between the display device and the computer system. Display device controller 122 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 101 through display device controller 122 and displays the information and data to the user of the computer system.

I/O bus 130 is used for communicating information between peripheral device which operate at lower throughput rates. I/O bus 130 can be a single bus or a combination of multiple buses. As an example, bus 130 can comprise an Industry Standard Architecture (ISA) bus, an Extended Industry Standard Architecture (EISA) bus or a Micro Channel Architecture (MCA) bus. Bus 130 provides communication links between components in the computer system. Keyboard interface 132 can be a keyboard controller or other keyboard interface. Keyboard interface 132 can be a dedicated device or can reside in another device such as a bus controller or other controller. Keyboard interface 132 allows coupling of a keyboard to the computer system and transmits signals from a keyboard to the computer system. Mass storage device 131 can be a hard disk drive, a floppy disk drive, a CD-ROM device, a flash memory device or other mass storage device. Mass storage device 131 provides information and data to external memory 113. Audio controller 133 operates to coordinate the recording and playing of sounds is also coupled to I/O bus 130. Bus bridge 123 couples bus 120 to bus 130. Bus bridge 123 comprises a translator to bridge signals between bus 120 and 130.

Bridge memory controller 111 comprises queue unit 112. Queue unit 112 operates to transmit data from CPU bus 110 operating in a first clocking domain to I/O bus 120 operating at a second clocking domain. Queue unit 112 comprises a counter unit in the first bus-system for generating multiple-bit signals in the first clocking domain. The counter unit is configured to generate signal values which change only one bit when changing from a first state to a next state. A synchronizer unit is coupled to the counter unit for receiving the multiple-bit signal and synchronizes the multiple-bit signal with the second clocking domain. Configuring the counter unit to generate signals which change only one bit when changing from a first state to a next state reduces the problems associated with data sampling during transition periods at the second sub-system. The signal would be sampled to be either in its current state or at its previous state. Since only one bit is changed, no invalid data will be sampled and transmitted.

Figure 2:
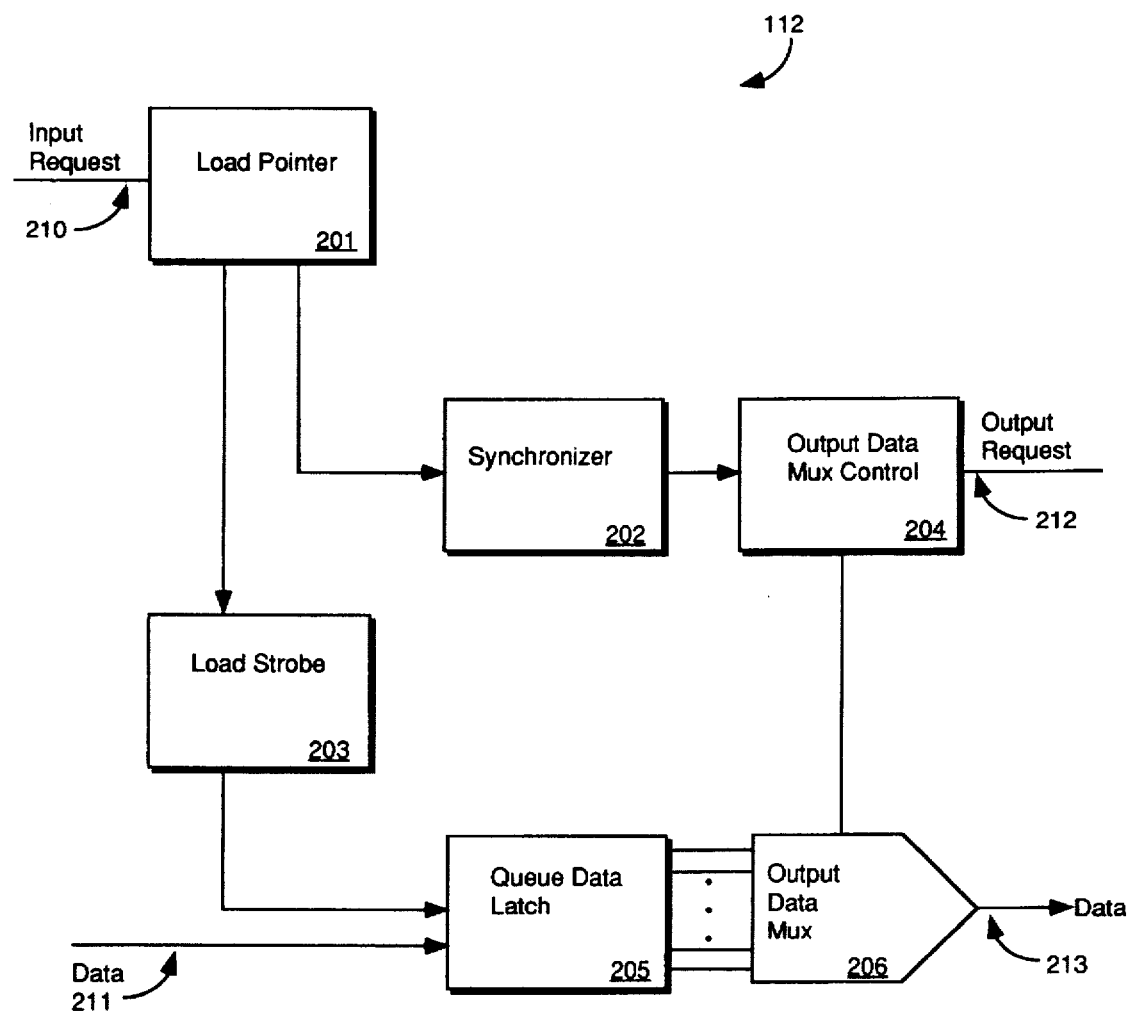
FIG. 2 illustrates a block diagram of a first embodiment of the present invention.

FIG. 2 illustrates a block diagram of queue unit 112 according to one embodiment of the present invention. The queue unit 112 illustrated in FIG. 2 may be used in a computer system where data is retrieved from queue data latch 205 at a rate equal to or greater than the rate data is written into queue data latch such that data overrun does not occur. Queue unit 112 comprises load pointer 201, synchronizer 202, load strobe 203, output data multiplexer control 204, queue data latch 205, and multiplexer 206. Load pointer 201 operates in the first clocking domain and functions as a pointer to indicate where data is to be stored in queue data latch 205. Data is loaded into and out of queue data latch 205 in a predefined order. Load pointer 201 is a counter configured to generate signals which change only one bit at a time when changing from one state to a next state. Each state represents a register in queue data latch 205. Load pointer 201 may be a Grey code counter for example. Upon each input request from line 210, load pointer 201 increments its count by one to indicate that the data is to be stored in a next counter.

Load strobe unit 203 operates in the first clocking domain and is coupled to load pointer 201. Load strobe unit 203 generates the load strobes for queue data latch 205. The load strobes generated by load strobe unit 203 regulates which registers are used to store data from data bus 211. These load strobes are generated based upon the load pointer output. Load strobe unit 203 may regulate queue data latch 205 to store data in a predefined order and to overwrite data previously loaded into one of the plurality of registers when a register scheduled to be loaded before that one register is full. Since data is retrieved from queue data latch 205 at a rate equal or greater than the rate which data is stored in queue data latch 205, queue unit 112 will not experience data overrun. Load strobe unit 203 may be implemented by any known logic circuit.

Queue data latch 205 operates in both the first and second clocking domain and is coupled to load strobe unit 203 and data bus 211. Loading of queue data latch 205 with data from data bus 211 is controlled by the load strobes that come from the output of load strobe unit 203. Queue data latch 205 may be implemented by using any known storage element. Queue data latch 205 may be a plurality of registers for storing data. Data stored in said plurality of registers may be either single bit data or multiple-bit data. In the preferred embodiment of the present invention, queue data latch 205 is a first-in/first-out (FIFO) memory.

Synchronizer 202 operates in both the first and second clocking domain and is coupled to load pointer 201. Synchronizer 202 contains synchronizers that change the clock domain of the outputs it receives from load pointer 201 as it transmits the output across the time boundary. Synchronizer 202 may be implemented by a pair of flip-flops for changing the clock domain of each bit of output from load pointer 201 from one clocking domain to another. The first flip-flop samples an input signal without regard to where the input signal is changing. If the sampling is performed during a transition period, the second flip-flop allows time for the first flip-flop to resolve the input signal with a sufficient amount of probability that there is an acceptable mean time between failures for the system. Synchronizer 202 is configured to output the counter value from load pointer 201 after the time required for the data in queue data latch 205 to become valid and stable for sampling. Thus, the value of the counter at the output of synchronizer 202 represents the counter in queue data latch 205 containing data ready to be sampled.

Output data multiplexer control 204 operates in the second clocking domain and is coupled to synchronizer 202. Output data multiplexer control 204 receives output requests from line 212 and counter values from synchronizer 202 indicating the register in queue data latch 205 which contains valid data ready to be sampled. Output data multiplexer control 204 keeps track of which registers were last accessed by an output request. Upon receiving a output request from line 212, output data multiplexer control 204 selects a next register containing valid data in queue data latch 205 to access. Output data multiplexer control 204 produces a corresponding data select signal which is output to data multiplexer 206.

Output data multiplexer 206 operates in the second clocking domain and is coupled to queue data latch 205. Output data multiplexer is controlled by the data select signals from the output data multiplexer control 204 that selects the appropriate piece of data from the latches in the queue data latch to be presented on the output data bus 213.

Queue unit 112 utilizes load pointer 201 to indicate when data from data bus 211 is valid in queue data latch 205 for sampling. When the counter value from load pointer 201 arrives at output data multiplexer control 204, output data multiplexer control 204 recognizes that the register in queue data latch 205 represented by the count value contains data valid for sampling. Output data multiplexer control 204 also recognizes that since data is loaded into queue data latch 205 in a predefined order, registers which are scheduled to be loaded before the register represented by the counter value also contains valid data. Queue unit 112 allows a first sub-system operating in the first clocking domain to indicate to a second sub-system operating in the second clocking domain when valid data is available to be sampled without utilizing the hardware required to send separate valid indication bits for each piece of data.

Figure 3:
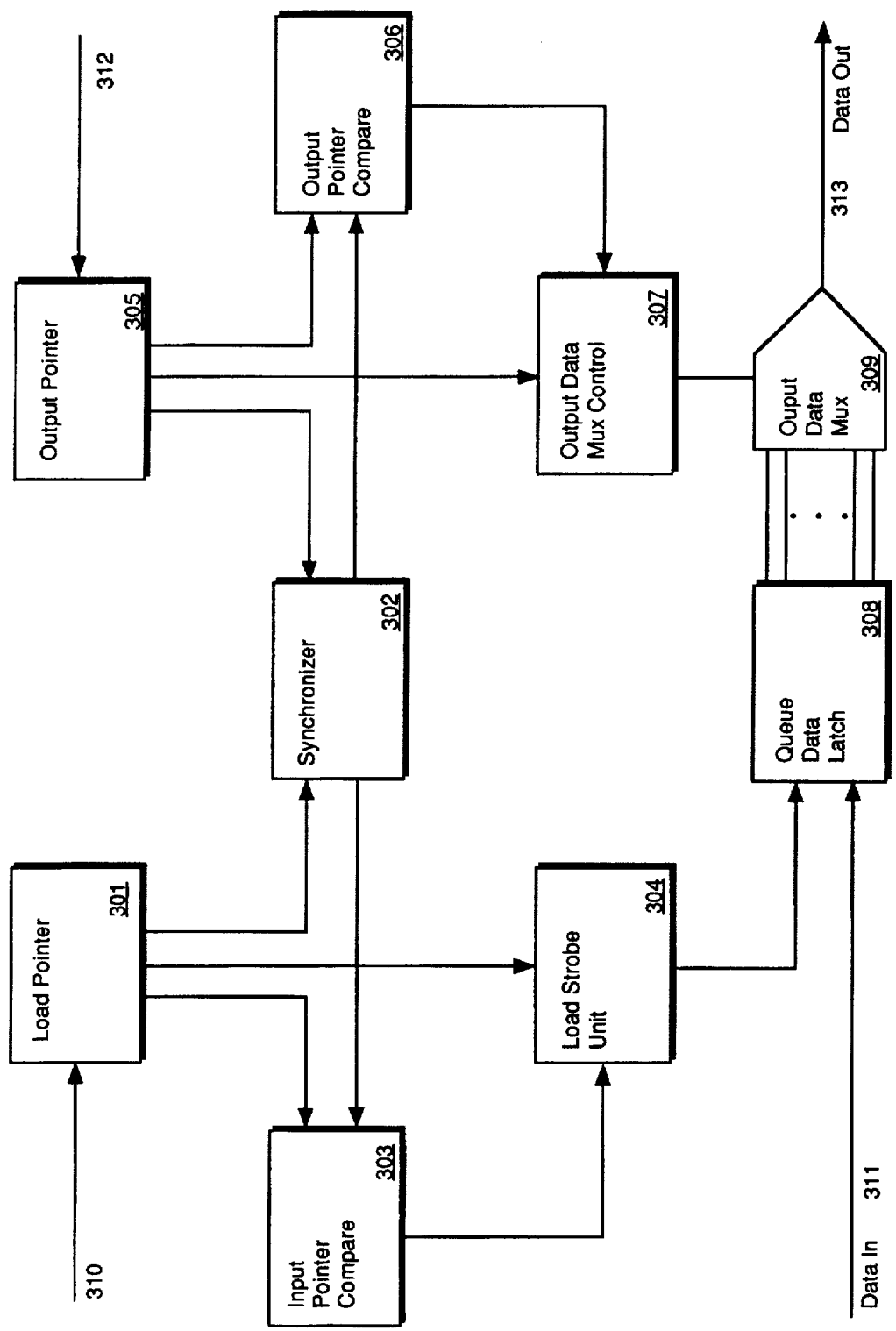
FIG. 3 illustrates a block diagram of a second embodiment of the present invention.

FIG. 3 illustrates a block diagram of a second embodiment of queue unit 112. Queue unit 112 comprises load pointer 301, synchronizer 302, load pointer compare 303, load strobe unit 304, output pointer 305, output pointer compare 306, output data multiplexer control 307, queue data latch 308, and output data multiplexer 309. Load pointer operates in the first clocking domain and functions as a pointer to indicate where data is to be stored in queue data latch 308. Load pointer 301 is a counter configured to generate signals which change only one bit at a time when changing from one state to a next state. Each counter value represents a register in queue data latch 308. Load pointer 301 may be a Grey code counter for example. Upon each input request from line 310, load pointer 301 increments its counter value by one.

Output pointer operates in the second clocking domain and functions as a pointer to indicate which register in queue data latch 308 is to be accessed to output data. Each counter value represents a counter in queue data latch 308. Output pointer 305 is a counter configured to generate signals which change only one bit at a time when changing from one state to a next state. Load pointer 305 may be a Grey code counter for example. Upon each output request received by line 312, output pointer 305 is increments its counter value by one. Output pointer 305 is clocked by the clock of the output port and is forced to 0 on reset.

Synchronizer 302 operates in both the first and second clocking domain and is coupled to load pointer 301 and output pointer 305. Synchronizer 302 contains synchronizers that change the clock domain of the outputs it receives from load pointer 301 from the first to the second clocking domain and output pointer 305 from the second to the first clocking domain. Similar to synchronizer 202 illustrated in FIG. 2, synchronizer 302 may be implemented by a pair of flip-flops or other known logic circuitry for changing the clock domain of each bit of output from load pointer 301 and output pointer 305 from one clocking domain to another. Synchronizer 302 is configured to output a counter value from load pointer 301 indicating the register in queue data latch 205 most recently loaded with data after the time required for the data to become valid. Synchronizer 302 also outputs a counter value from output pointer 305 which indicates which register in queue data latch 308 has recently been access to output data.

Input pointer compare 303 operates in the first clocking domain and is coupled to load pointer 301 and synchronizer 302. Input pointer compare 303 operates to compare the counter value from load pointer 301 with the synchronized version of the output pointer counter value from synchronizer 302. By comparing the counter value indicating which register in queue data latch 308 was last accessed to store data from data bus 311 with the counter value indicating which register in queue data latch 308 was last accessed to output data onto data bus 313, input pointer compare 303 is able to determine whether the registers in queue data latch 308 corresponding to the counter value from input counter 301 may be written into to store new data from data bus 311. Input pointer compare 303 produces one or more signals that indicate the availability of empty queue locations. The input pointer compare also generates a full indication for load strobe unit 304. When the counter values from load pointer 301 and output pointer 305 indicate that all of the current registers in queue data latch 308 are occupied and that none of the data previously loaded into queue data latch 308 has been accessed for output onto data bus 313, input pointer compare 303 outputs a "full" signal to load strobe unit 304. Input pointer compare 303 may be implemented by a comparator or any known logic circuitry.

Load strobe unit 304 operates in the first clocking domain and is coupled to load pointer 301. Load strobe unit 304 generates the load strobes for queue data latches 308. The load strobes generated by load strobe unit 308 regulates which registers are used to store data from data bus 311. These load strobes are generated based upon the output from input pointer compare 303. Load strobe unit 304 outputs load strobes to queue data latch 308 upon receiving a new counter value from load pointer 301. Load strobe unit 304 may be implemented by any known logic circuit.

Queue data latch 308 operates in both the first and second clocking domain and is coupled to load strobe unit 304 and data bus 311. Loading of queue data latch 308 with data from data bus 311 is controlled by the load strobes that come from the output of load strobe unit 304. Queue data latch 308 may be implemented by using any known storage element. Queue data latch 308 may be a plurality of registers for storing data. Data stored in said plurality of registers may be either single bit data or multiple-bit data. In the preferred embodiment of the present invention, queue data latch 205 is a first-in/first-out (FIFO) memory.

Output pointer compare 306 operates in the second clocking domain and is coupled to synchronizer 302 and output pointer 305. Output pointer compare 306 compares the counter value received from output pointer 305 with the synchronized version of the counter value from load pointer 301 that comes out of the synchronizer 302. By comparing the counter value indicating which register in queue data latch 308 was last accessed to store data from data bus 311 with the counter value indicating which register in queue data latch 308 was last accessed to output data onto data bus 313, output pointer compare 305 is able to determine whether the register in queue data latch 308 corresponding to the counter value from output pointer 305 may be accessed to retrieve valid data. Output pointer compare 305 produces one or more signals that indicate the availability of queue locations with valid data. When the counter values from load pointer 301 and output pointer 305 indicate that all of the data previously loaded into queue data latch 308 has been accessed for output onto data bus 313, output pointer compare realizes that the queue data latch 308 is empty. Output pointer compare 307 may be implemented by a comparator or any known logic circuitry.

Output data multiplexer control 307 operates in the second clocking domain and is coupled to output pointer 305 and output pointer compare 306. Output data multiplexer control decodes the output received from output pointer compare 306 and produces data select signals for output data multiplexer 309 upon receiving a new counter value from output pointer 305.

Output data multiplexer 309 operates in the second clocking domain and is coupled to queue data latch 205 and output data multiplexer control 307. Output data multiplexer 309 is controlled by the data select signals from the output data multiplexer control 309 that selects the appropriate piece of data from the latches in the queue data latch to be presented on the output data bus 313.

Queue structure 112 is configured to avoid data overruns. Input pointer compare 303 outputs a "full" signal to load strobe unit 304 when a counter value from input pointer 301 and a synchronized counter value from output pointer 305 indicate that all registers in queue data latch 308 are occupied and none of the data previously loaded into queue data latch 308 has been accessed for output onto data bus 313. Input pointer 303 outputs a "not full" signal when the counter value from input pointer 301 and the synchronized counter value from output pointer 305 indicate that there are registers in queue data latch 308 which may be written into. The count value from input pointer 301 is in the same clock domain as input pointer compare and is thus always current. The synchronized counter value from output pointer 305, however, requires synchronization and is thus not always current. Thus, the count value from output pointer 305 will sometimes inaccurately indicate that less data has been removed from queue data latch 308 than which actually was. The only inaccuracy in the assessment of space availability will be the occasional false "full" indication. These "false full" and "false empty" indications will only persist until another synchronized pointer value arrives. After that time, the indicators are again accurate.

Queue structure 112 is configured to avoid data underruns. Output pointer compare 306 outputs an "empty" signal to output data multiplexer control 307 when counter values from output pointer 305 and synchronized counter value from input pointer 303 indicates that the register to be accessed for data to be output on data bus 313 does not contain new data that has not been previously accessed. Output pointer compare 306 outputs a "not empty" signal when the counter value from output pointer 305 and the counter from the synchronized input pointer 301 indicate that the register to be accessed contains data not previously accessed. The count value from output pointer 305 is in the same clock domain as output pointer compare 306 and thus is always current. The synchronized count value from input pointer 301, however, requires synchronization and is thus not always current. Thus, more data could have actually been loaded into queue data latch 308 than is indicated. Thus the only inaccuracy in the assessment of data available will be occasional false "empty" indications.

The implementation of counters which changes 1 bit between any two adjacent states allows multiple-bit data to be passed across an asynchronous boundary. If only 1 bit of the count value can ever be changing at the sampling time, the only possible result of asynchronously sampling the count is the correct old value or the correct new value. Since the information that is transmitted across the asynchronous boundary is a count of how much data has been moved, it does not matter if an intermediate value gets dropped in the transmission process. This is true because the receiving side will always have a value that was valid at some time in the past and when the transmitting side runs into its limit it will stop. After the transmitting side stops changing its count value, the receiving side will eventually receive this terminal value, so even if some intermediate value of the count gets lost, the terminal value will always arrive correctly.

Queue unit 112 allows data to be loaded from data bus 311 into queue data latch 308 at any rate until queue data latch 308 becomes full. Queue unit 112 also allows data to be unloaded from queue data latch 308 and put on data bus 313 at any rate until queue data latch 308 is empty. Loading and unloading of data from queue data latch 308 is not constrained by a handshaking algorithm or a need for an acknowledgment for each transmission of data.

Figure 4:
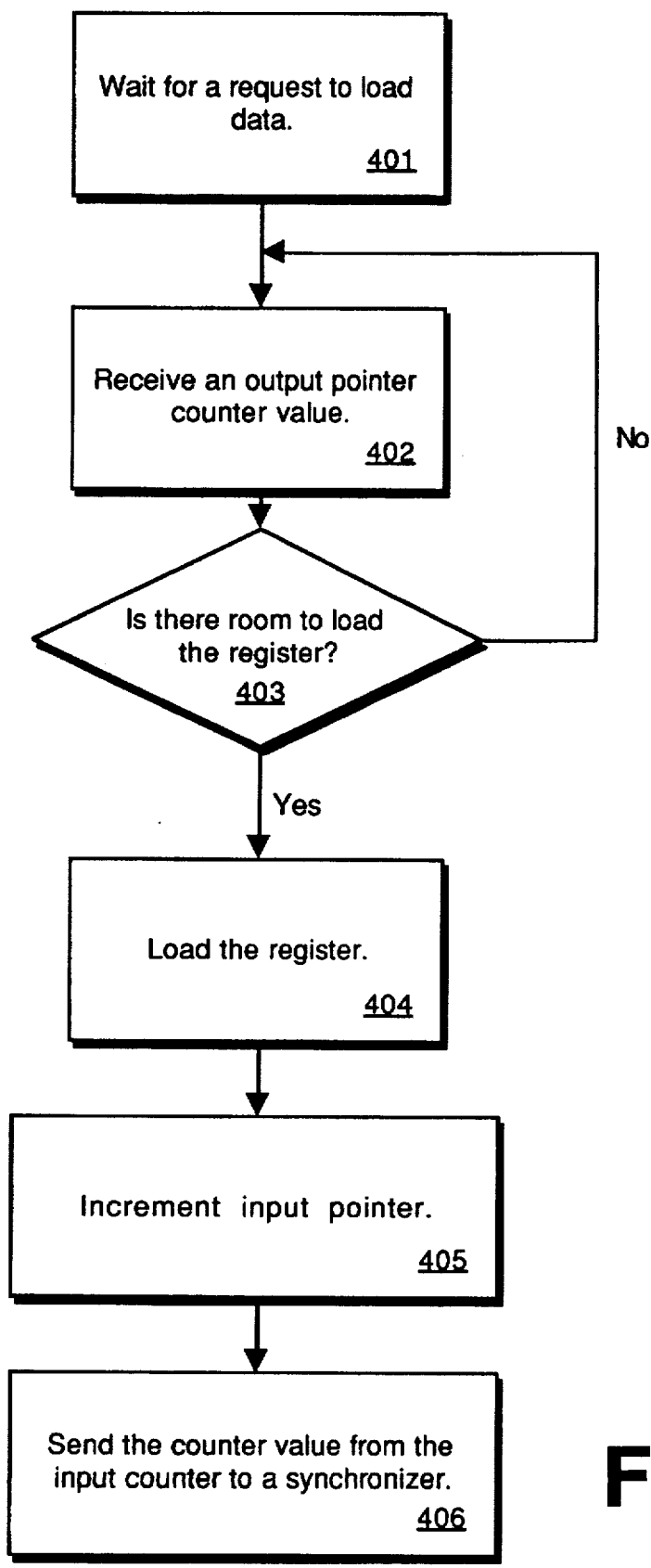
FIG. 4 is a flow chart illustrating a method for transmitting data between asynchronous clocking domains.

FIG. 4 is a flow chart illustrating a method for transmitting a multiple-bit signal from a first sub-system operating in a first clocking domain in a computer system to a second sub-system operating in a second clocking domain in the computer system. First, wait for a request to send data from the first sub-system to the second sub-system. This is illustrated in block 401. Upon receipt of a request to send data, receive a counter value from an output pointer. This is shown in block 402. The output pointer operates to indicate which register has currently been accessed to unload previously stored data. The output pointer is also configured to generate signals which change only one bit at a time when changing from one state to a next state. Each of the counter values also represent a different register. The output pointer may also be a Grey code counter. Next, determine if there is a register available to load the data to be sent from the first sub-system to the second sub-system as shown in block 403. This can be achieved by comparing the counter value from the input pointer with the counter value from the output pointer. Since data is loaded and unloaded from the registers in a predefined order, one can determine if the register corresponding to the counter value from the input register is available to load the data. If the register is not available to be loaded, go to block 402. If the register is available to load the data, load the data into the register. This is shown in block 404. Increment an input pointer as shown in block 405. The input pointer operates as a counter to indicate which of a plurality of registers is to be loaded with the data. The input pointer is a counter configured to generate signals which change only one bit a time when changing from one state to a next state. Each of the counter values represents a different register. The plurality of registers are loaded and unloaded in a predefined order. The first counter may be a Grey code counter for example. The plurality of registers may be a FIFO, for example. Next, send the value of the first counter to a synchronizer, as shown in block 406.

Figure 5:
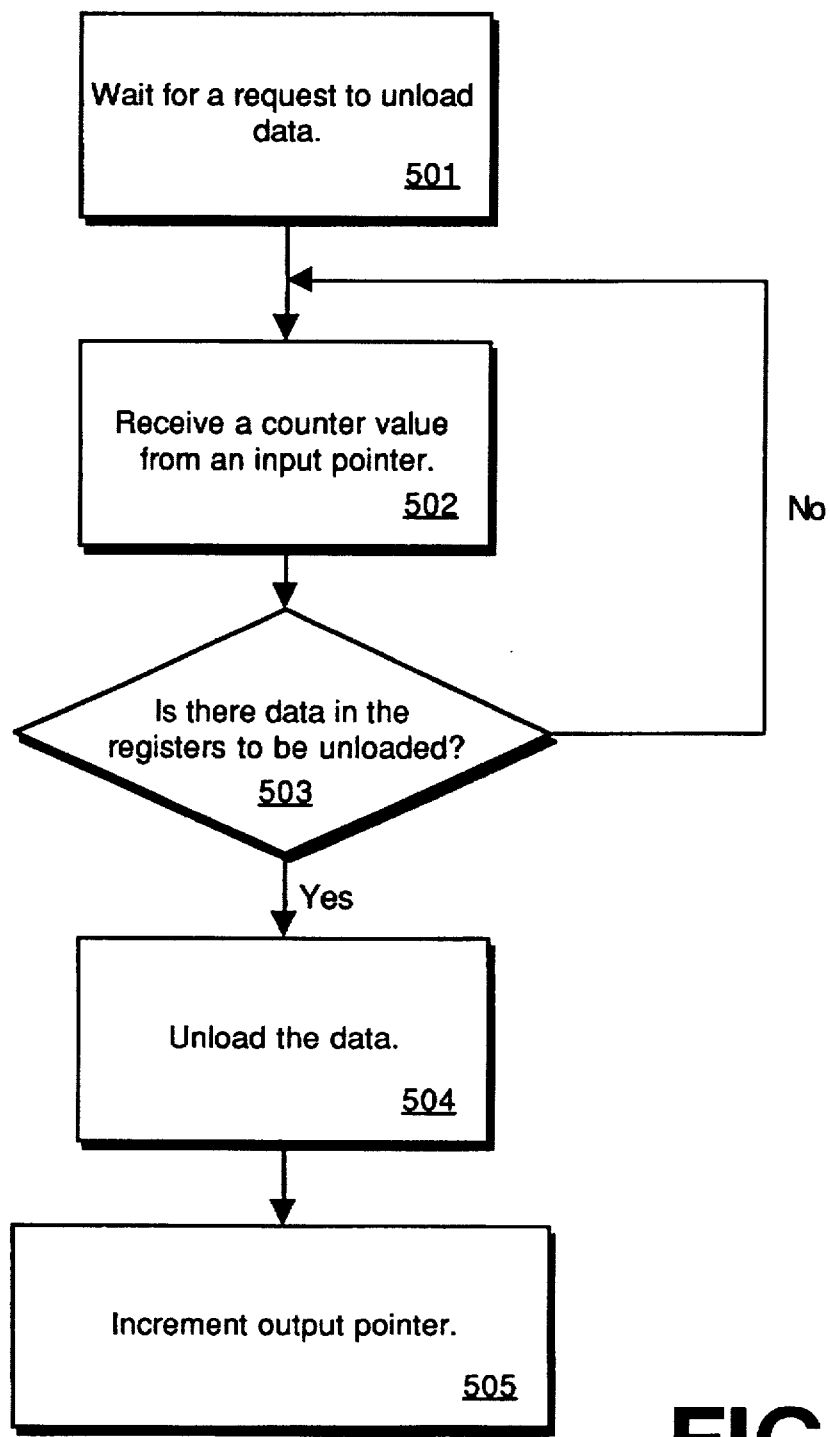
FIG. 5 is a flow chart illustrating a method for receiving data between asynchronous clocking domains.

FIG. 5 is a flow chart illustrating a method for receiving a multiple-bit signal from a first sub-system in a first clocking domain while operating in a second sub-system in a second clocking domain. First, wait for a request to receive data from the first sub-system. This is illustrated in block 501. Upon receipt of a request to receive data, receive a counter value from an input pointer. This is shown in block 502. The input pointer operates as a counter to indicate which register has currently been accessed to load data. The input pointer is also configured to generate signals which change only one bit at a time when changing from one state to a next state. Each of the counter values also represent a different register. The input pointer may also be a Grey code counter. Next, determine if data is available to be unloaded from the register corresponding to the counter value from the output pointer, as shown in block 503. This can be achieved by comparing the counter value from the output pointer with the counter value from the input pointer. Since data is loaded and unloaded from the registers in a predefined order, one can determine if data is available to be unloaded from one of the registers by comparing the counter values. If no data is available, go to block 502. If data is available in the register unload the data. This is shown in block 504. Increment an output pointer as shown in block 505. The output pointer operates as a counter to indicate which register the data is to be unloaded from. The output counter is a counter configured to generate signals which change only one bit a time when changing from one state to a next state. Each of the counter value represents a different register. The registers are loaded and unloaded in a predefined order. The output counter may be a Grey code counter for example. The registers may be a FIFO, for example.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be limiting. Therefore, references to details of particular embodiments are not intended to limit the scope of the claims, which in themselves recite only those features regarded as essential to the invention.

We claim:

1. An apparatus, comprising:
    a queue data latch having n storage elements, where n is a number less than four;
    a load pointer in a first clocking domain that generates a first multiple-bit signal value that corresponds to one of the storage elements which data is to be loaded, wherein each multiple-bit signal value generated by the load pointer has an incrementation of one bit when changing from one state to a next state; and
    a synchronizer unit, coupled to the load pointer, that receives the first multiple-bit signal value and synchronizes the first multiple-bit signal with a second clocking domain.

2. The apparatus of claim 1, wherein the load pointer comprises a Grey code counter.

3. The apparatus of claim 1, wherein the synchronizer unit comprises a pair of flip-flops.

4. The apparatus of claim 1 further comprising an output pointer in the second clocking domain, coupled to the synchronizer unit, that generates a second multiple-bit signal value that corresponds to one of the storage elements that data is to be retrieved from.

5. The apparatus of claim 4 further comprising an input pointer compare unit, coupled to the synchronization unit, that compares the first multiple-bit signal value with the second multiple-bit signal value to determine whether data can be stored in the storage element corresponding to the first multiple-bit signal.

6. The apparatus of claim 4 further comprising an output pointer compare unit, coupled to the synchronization unit, that compares the first multiple-bit signal value with the second multiple-bit signal value to determine whether data can be retrieved from the storage element corresponding to the second multiple-bit signal.

7. A computer system, comprising:
    a bus;
    a processor coupled to the bus;
    a queue unit having a queue data latch having n storage elements, where n is a number less than four, a load pointer in a first clocking domain that generates a first multiple-bit signal value that corresponds to one of the storage elements which data is to be loaded, wherein each multiple-bit signal value generated by the load pointer has an incrementation of one bit when changing from one state to a next state, and a synchronizer unit, coupled to the load pointer, that receives the first multiple-bit signal value and synchronizes the first multiple-bit signal with a second clocking domain.

8. The computer system of claim 7, wherein the load pointer comprises a Grey code counter.

9. The computer system of claim 7, wherein the synchronizer unit comprises a pair of flip-flops.

10. The computer system of claim 7 further comprising an output pointer in the second clocking domain, coupled to the synchronizer unit, that generates a second multiple-bit signal value that corresponds to one of the storage elements that data is to be retrieved from.

11. The computer system of claim 10 further comprising an input pointer compare unit, coupled to the synchronization unit, that compares the first multiplebit signal value with the second multiple-bit signal value to determine whether data can be stored in the storage element corresponding to the first multiple-bit signal.

12. The computer system of claim 10 further comprising an output pointer compare unit, coupled to the synchronization unit, that compares the first multiple-bit serial bit signal value with the second multiple-bit signal value to determine whether data can be retrieved from the storage element corresponding to the second multiple-bit signal.

13. A method for transmitting data, comprising:

generating a first multiple-bit signal value in a first clocking domain that corresponds to one of n storage elements that is to be used to store data, where n is a number less than four; and synchronizing the first multiple-bit signal value such that the first multiple-bit signal value is output at a second clocking domain when the data is ready to be sampled at the second clocking domain.

14. The method of claim 13 further comprising the steps of:

generating a second multiple-bit signal value in the second clocking domain that corresponds to one of the plurality of storage elements that data is to be sampled from in the second clocking domain; and comparing the first multiple-bit signal value with the second multiple-bit signal value to determine whether the data may be stored in the storage element corresponding to the first multiple-bit signal value.

15. The method of claim 14 further comprising the step of comparing the first multiple-bit signal value with the second multiple-bit signal value to determine whether the data in the storage element corresponding to the second multiple-bit value may be sampled.

16. An apparatus, comprising:

a queue data latch having n storage elements, where n is a number less than four;

a load pointer in a first clocking domain that generates a first multiple-bit signal value that corresponds to one of the storage elements which data is to be loaded, wherein each multiple-bit signal value generated by the load pointer has an incrementation of one bit when changing from one state to a next state;

a synchronizer unit, coupled to the load pointer, that receives the first multiple-bit signal value and synchronizes the first multiple-bit signal with a second clocking domain;

output pointer in the second clocking domain, coupled to the synchronizer unit, that generates a second multiple-bit signal value that corresponds to one of the storage elements that data is to be retrieved from; and an input pointer compare unit, coupled to the synchronization unit, that compares the first multiple-bit signal value with the second multiple-bit signal value to determine whether data can be stored in the storage element corresponding to the first multiple-bit signal.

* * * * *